US009139021B2

(12) United States Patent
Nakajima

(10) Patent No.: US 9,139,021 B2
(45) Date of Patent: Sep. 22, 2015

(54) NAIL PRINT APPARATUS AND PRINT METHOD THEREOF

(71) Applicant: CASIO COMPUTER CO., LTD., Shibuya-ku, Tokyo (JP)

(72) Inventor: Ai Nakajima, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/104,999

(22) Filed: Dec. 12, 2013

(65) Prior Publication Data

US 2014/0168668 A1 Jun. 19, 2014

(30) Foreign Application Priority Data

Dec. 17, 2012 (JP) ................................ 2012-274764

(51) Int. Cl.
*G06F 15/00* (2006.01)
*B41J 3/407* (2006.01)
*A45D 29/00* (2006.01)

(52) U.S. Cl.
CPC ......... *B41J 3/4073* (2013.01); *A45D 2029/005* (2013.01)

(58) Field of Classification Search
USPC ........................................................ 358/1.15
See application file for complete search history.

(56) References Cited

U.S. PATENT DOCUMENTS 6,286,517 B1 9/2001 Weber et al.
2008/0087291 A1* 4/2008 Jordan ......................... 132/200
2011/0315027 A1* 12/2011 Bitoh ............................. 101/35

FOREIGN PATENT DOCUMENTS

JP 2003-534083 A 11/2003

* cited by examiner

*Primary Examiner* — Saeid Ebrahimi Dehkord
(74) *Attorney, Agent, or Firm* — Holtz, Holtz, Goodman & Chick PC

(57) ABSTRACT

A nail print apparatus, including: a printing unit which has a print head that performs printing on a nail of a finger or toe; and a control unit which controls the printing unit on a basis of image data including position information that shows a position to attach at least one decorative part to the nail so as to print placement information including the position information on the nail.

17 Claims, 11 Drawing Sheets

NAIL PRINT APPARATUS AND PRINT METHOD THEREOF

CROSS-REFERENCE TO RELATED APPLICATIONS

The entire disclosure of Japanese Patent Application No. 2012-274764 filed on Dec. 17, 2012 including description, claims, drawings, and abstract are incorporated herein by reference in its entirety.

BACKGROUND OF THE INVENTION

1. Field of the Invention

The present invention relates to a nail print apparatus which performs printing on a fingernail and a print method thereof.

2. Description of Related Art

The nail print apparatus is a print apparatus which prints design images such as colors and pictures on fingernail surfaces of a person. Such nail print apparatus is described in Japanese Unexamined Patent Application Publication No. 2003-534083, for example.

By using such apparatus, nail art can be enjoyed easily without visiting nail salons and such like.

In the nail art conducted at a nail salon and such like, decoration is also applied by attaching decorative parts such as rhinestones to nail portions after applying a base color to the surfaces of the nail portions and drawing various pictures and such like.

In contrary, conventional nail print apparatuses have no function of providing information regarding attachment positions of the decorative parts such as rhinestones and the type of decorative parts suitable for the design.

Thus, when a user intends to apply decoration as in the nail salons, the user needs to determine the location and such like of decorative parts and attach them to the nails by himself/herself after nail printing is performed.

However, when applying such decoration by himself/herself, the user does not know the positions to attach the decorative parts on the nails or cannot determine what kind of decorative parts to select and attach, and thus it is difficult to apply decoration as intended.

Also, in a case of recreating a nail art while seeing a sample such as a picture, the user conventionally needs to place the decorative parts on his/her own nails while comparing the nails with the sample. However, it is difficult to attach the decorative parts such as rhinestones to the nails, which have no marks, at the same positions as the sample.

Thus, it is difficult to casually enjoy decorated nail arts.

SUMMARY OF THE INVENTION

An object of the present invention is to provide a nail print apparatus and a print method thereof which can enable anyone to casually enjoy a decorated nail art by enabling a user to easily attach decorative parts to appropriate positions when printing a nail design which is designed to attach decorative parts on nails.

In order to solve the above object, according to one aspect of the present invention, there is provided a nail print apparatus, including: a printing unit which has a print head that performs printing on a nail of a finger or toe; and a control unit which controls the printing unit on a basis of image data including position information that shows a position to attach at least one decorative part to the nail so as to print placement information including the position information on the nail.

According to another aspect of the present invention, there is provided a print method of a nail print apparatus, the nail print apparatus including a printing unit having a print head that performs printing on a nail of a finger or toe, the method including: controlling the printing unit on a basis of image data including the position information that shows a position to attach at least one decorative part on the nail; printing placement information including the position information on the nail.

BRIEF DESCRIPTION OF THE DRAWINGS

The above and other objects, advantages and features of the present invention will become more fully understood from the detailed description given hereinafter and the appended drawings which are given byway of illustration only, and thus are not intended as a definition of the limits of the present invention, and wherein.

DETAILED DESCRIPTION OF THE PREFERRED EMBODIMENT

Hereinafter, a nail print apparatus and a print control method thereof according to the present invention will be described in detail with reference to the drawings.

Though the after-mentioned embodiment is provided with various technical limitations to perform the present invention, the scope of the present invention is not limited to the following embodiment and illustrated examples.

Figure 1:
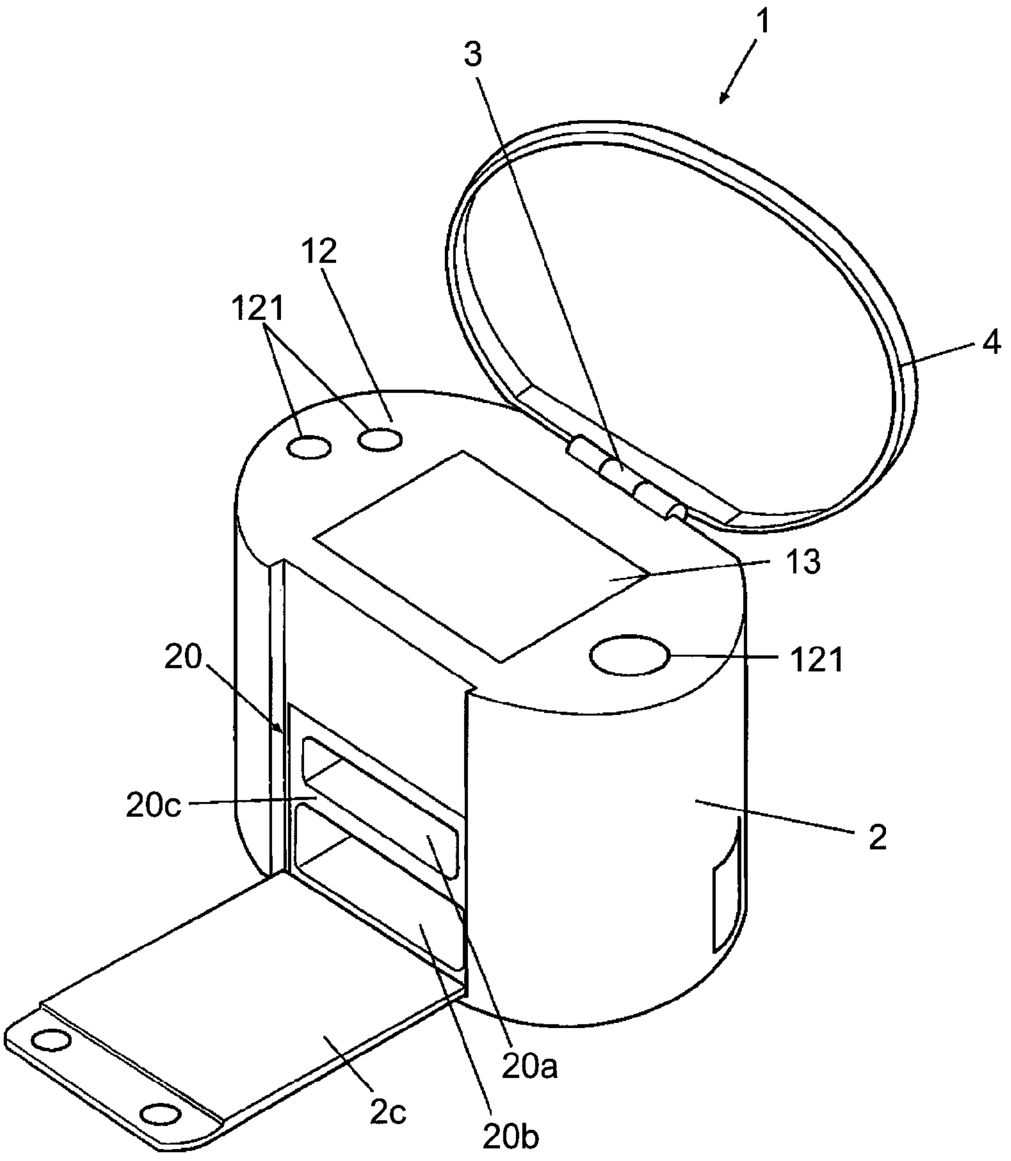
FIG. 1 is a perspective view showing an example of the outer appearance of a nail print apparatus in the embodiment, which shows a state where a cover is open.

FIG. 1 is a perspective view showing an external appearance of a nail print apparatus in the embodiment.

Figure 2:
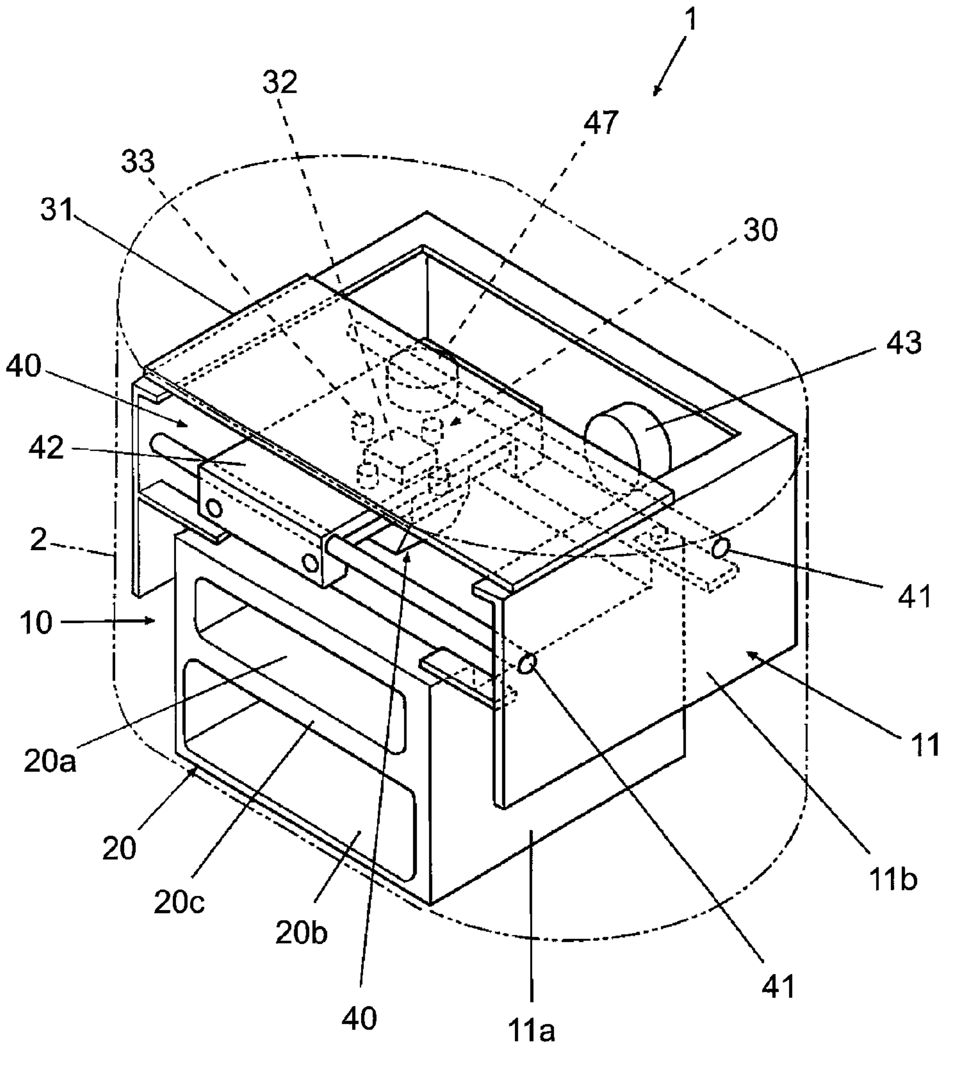
FIG. 2 is a perspective view showing an inner configuration of the nail print apparatus of FIG. 1.

FIG. 2 is a perspective view showing an inner configuration of the nail print apparatus.

The nail print apparatus 1 of the embodiment is configured to print images including placement information of decorative parts to be attached to nails on user's nails in addition to print a desired picture on the user's nails as mentioned below. Thus, the nail print apparatus 1 assists a user to attach the decorative parts to the nails so that the decorated nail art can be casually enjoyed.

Here, "decorative part" is a part which a user attaches onto a nail T to decorate the nail T after the printing process on the nail T by the nail print apparatus 1. The decorative parts are the decorative parts p1 to p6 in after-mentioned FIGS. 11B and 11C, for example.

As the "decorative parts", rhinestones, natural stones such as precious stones and semiprecious stones, seals, beads and crystal glass such as crystal glass manufactured by Swarovski can be adopted, for example. The decorative parts are not limited to the above examples.

As shown in FIG. 1, the nail print apparatus 1 includes a case main body 2 and a cover 4.

The cover 4 is connected to the case main body 2 so as to be rotatable via a hinge 3 provided at a rear end portion on the upper surface (top plate) of the case main body 2.

The cover 4 is rotatable from a state of lying on the top plate of the case main body 2 to a state (see FIG. 1) of vertically providing with respect to the top plate of the case main body 2 with the hinge 3 as the supporting point.

The case main body 2 is formed in a nearly oval shape in a plan view from above.

An opening/closing plate 2*c* is provided at the front side of the case main body 2 so as to be able to flip up and down.

The opening/closing plate 2*c* is joined to the case main body 2 via a hinge (not shown in the drawings) which is provided at the lower end portion of the front surface of the case main body 2. The opening/closing plate 2*c* is for opening and closing the front surface of the case main body 2.

The shapes and configurations of the case main body 2 and the cover 4 are not limited to the examples illustrated here.

An operation unit 12 is set on the upper surface (top plate) of the case main body 2.

The operation unit 12 is for performing various input by a user.

The operation unit 12 is provided with a power switch button to turn on the nail print apparatus 1, a stop switch button to stop an operation, a design selection button to select a nail design (see FIG. 8, for example) to be printed on a nail T, a print start button to instruct the print start and operation buttons 121 for performing other various types of input, for example.

In the embodiment, a design selection screen for selecting a nail design is displayed on a display unit 13, for example. Then, by the user selecting the desired nail design with the operation button 121, the nail design to be printed is selected.

In the embodiment, as described later, a print mode can be selected between a "normal mode" in which a nail design itself is printed and an "attachment guide mode" in which placement information of decorative parts (decorative parts p1 to p6 of FIGS. 11B and 11C, for example) can also be printed. In the "attachment guide mode", it is assumed that decorative parts are to be attached.

The user can select a desired print mode between the "normal mode" and the "attachment guide mode" by operating the operation buttons 121.

In the embodiment, when selecting the print mode in which placement information of decorative parts is also printed, the user can further set colors of portions corresponding to the decorative parts by operating the operation buttons 121.

A display unit 13 is set at a nearly central portion of the upper surface (top plate) of the case main body 2.

The display unit 13 is configured by including a liquid crystal display (LCD: Liquid Crystal Display), an organic electroluminescent display and other flat display, for example.

In the embodiment, on the display unit 13, an image (hereinafter, called "finger image") obtained by photographing a printing finger U1, a nail image (image such as the outline of a nail T) included in the finger image, a design selection screen for selecting an image (that is, "nail design" in FIG. 8) to be printed on the nail T, thumbnail images for design confirmation, instruction screens for displaying various instructions are appropriately displayed, for example.

A touch panel may be integrally formed on the surface of the display unit 13. In such case, it is configured so that various types of input can be carried out also by a touching operation of touching the surface of the display unit 13 with a stylus pen which is a writing tool of sharpened stick and write down by being pressed against the touch panel surface and a fingertip, for example. In this case, the touch panel on the display unit 13 also functions as an operation unit for performing various input.

An apparatus main body 10 of the nail print apparatus 1 is contained in the case main body 2.

Figure 7:
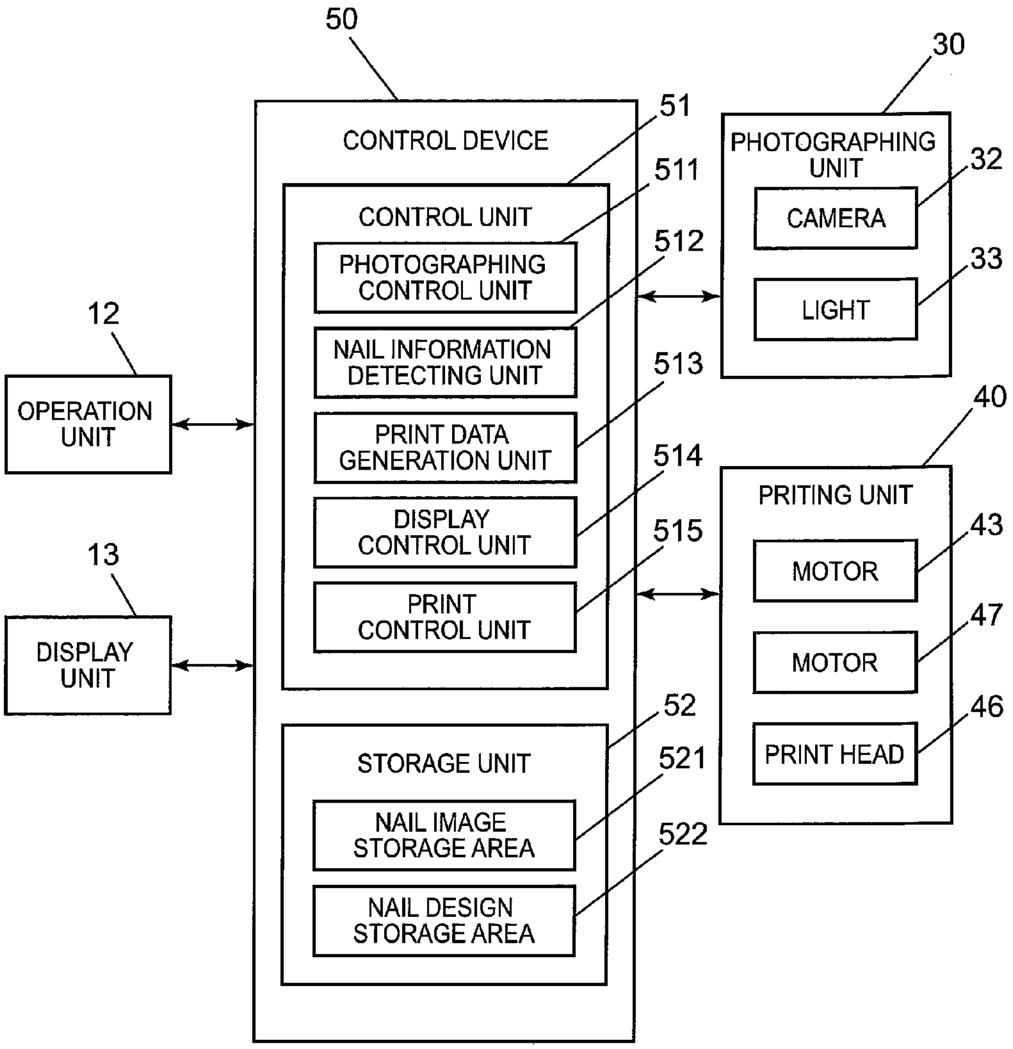
FIG. 7 is a main part block diagram showing a control structure of a nail print apparatus according to the embodiment.

The apparatus main body 10 includes a printing finger fixing unit 20, a photographing unit 30 and a printing unit 40 which are shown in FIG. 2 and a control device 50 (see FIG. 7).

The printing finger fixing unit 20, the photographing unit 30, the printing unit 40 and the control device 50 are provided in a machine casing 11.

The machine casing 11 is configured by including a lower machine casing 11*a* and an upper machine casing 11*b*.

The lower machine casing 11*a* is formed in a box shape and is set at the lower side in the case main body 2. The upper machine casing 11*b* is set above the lower machine casing 11*a* and at the upper section inside the case main body 2.

The printing finger fixing unit 20 is provided in the lower machine casing 11*a* of the machine casing 11.

That is, the lower machine casing 11*a* is provided with a printing finger inserting unit 20*a*, a non-printing finger inserting unit 20*b* and a grasping unit 20*c*, and the printing finger fixing unit 20 is configured by including them.

Here, the printing finger inserting unit 20*a* is a finger inserting unit for inserting fingers (hereinafter, called "printing fingers U1") corresponding to nails T to be printed (see FIG. 3).

The bottom surface (upper surface of the grasping unit 20*c* in the embodiment) of the printing finger inserting unit 20*a* functions as a finger placement unit (printing finger placement surface) to place the printing fingers U1.

Photographing, printing and such like of each of the printing fingers U1 are performed in a state where the printing finger U1 is placed on the printing finger placement surface (upper surface of the grasping unit 20*c*) of the printing finger inserting unit 20*a* as the finger placement unit.

The non-printing finger inserting unit 20*b* is a finger inserting unit for inserting a finger (hereinafter called "non-printing finger U2") other than the printing fingers.

The grasping unit 20*c* is a part which can be held between the printing fingers U1 inserted into the printing finger inserting unit 20*a* and the non-printing finger U2 inserted into the non-printing finger inserting unit 20*b*.

In the embodiment, the grasping unit 20*c* includes a dividing wall which divides the printing finger inserting unit 20*a* from the non-printing finger inserting unit 20*b*.

As for the end of the grasping unit 20*c* from where fingers are inserted, the preferable shape of the cross-section is a circle, an oval, a polygon and such like which are naturally fitted when abutting with bases U3 of the printing fingers U1 and the non-printing finger U2 so that the grasping unit 20*c* (dividing wall) can be held firmly between the printing fingers U1 and the non-printing finger U2 in a state where the entire balls of the printing fingers U1 abut the finger placement surface.

Figure 3:
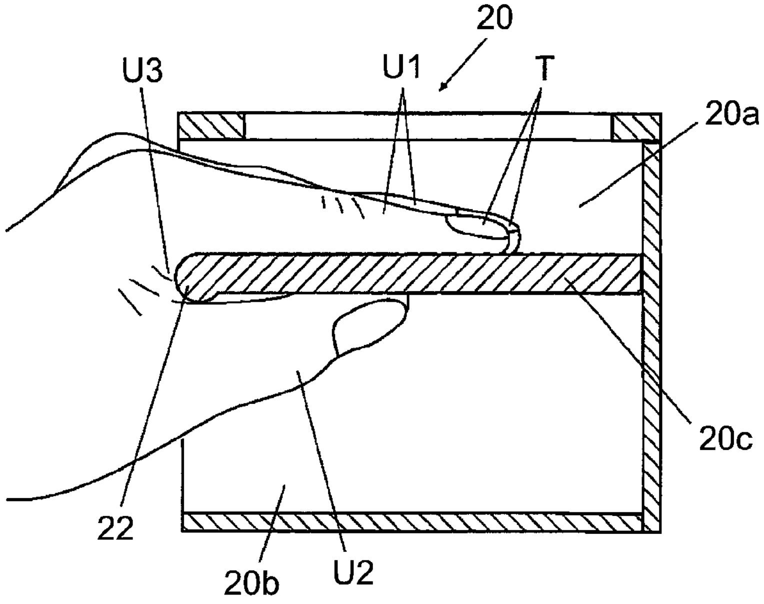
FIG. 3 is a sectional view showing a printing finger fixing unit of the nail print apparatus of FIG. 1, which shows a fixed state where an index finger to a little finger as printing fingers are inserted into a printing finger inserting unit.

For example, the four fingers (index finger, middle finger, ring finger and little finger) other than the thumb of the left hand are the printing fingers U1, as shown in FIG. 3, the user inserts the four printing fingers U1 (index finger, middle finger, ring finger and little finger) into the printing finger inserting unit 20*a* and inserts the thumb which is the non-printing finger U2 into the non-printing finger inserting unit 20*b*.

In such case, the printing fingers U1 are fixed on the grasping unit 20*c* by the user holding the grasping unit 20*c* between the printing fingers U1 and the non-printing finger U2.

Figure 4:
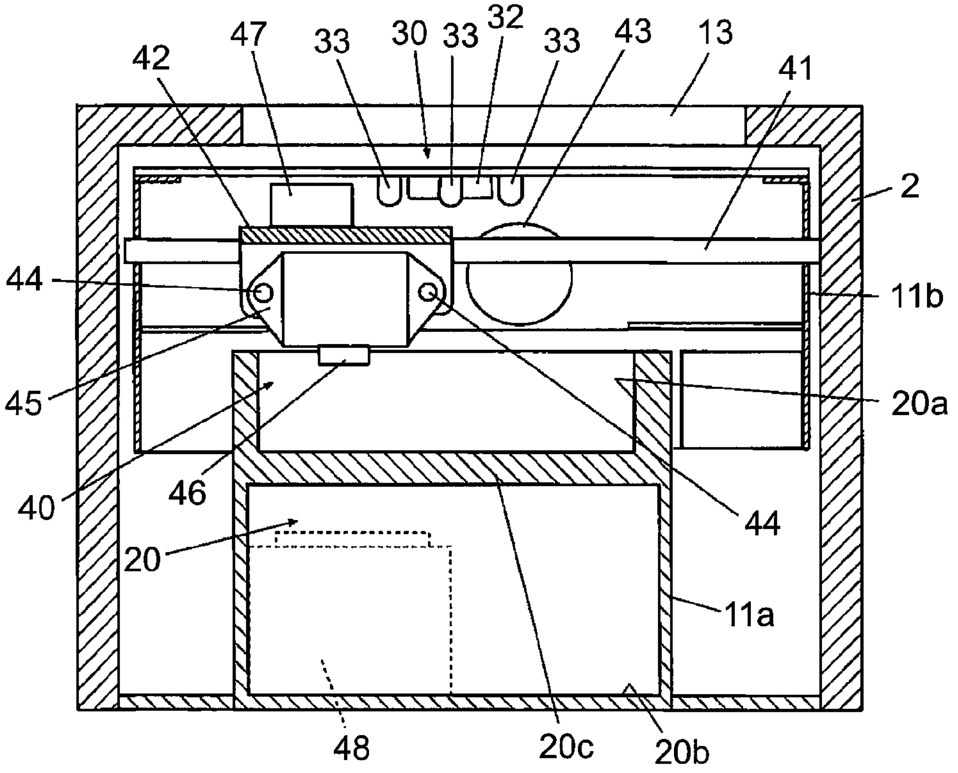
FIG. 4 is a sectional view of the nail print apparatus of FIG. 1 seen from the front side.

FIG. 4 is a sectional view of the nail print apparatus 1 according to the embodiment seen from the front side.

Figure 5:
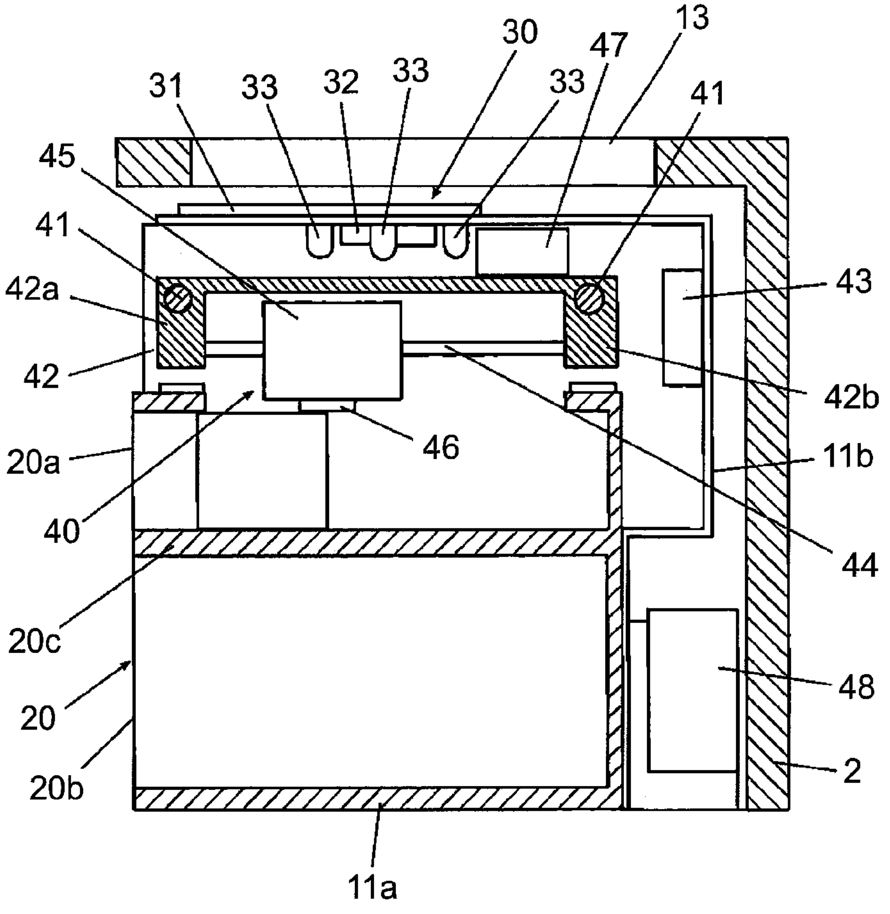
FIG. 5 is a sectional view of the nail print apparatus of FIG. 1 seen from the lateral side.

FIG. 5 is a sectional view of the nail print apparatus 1 seen from a lateral side.

Figure 6:
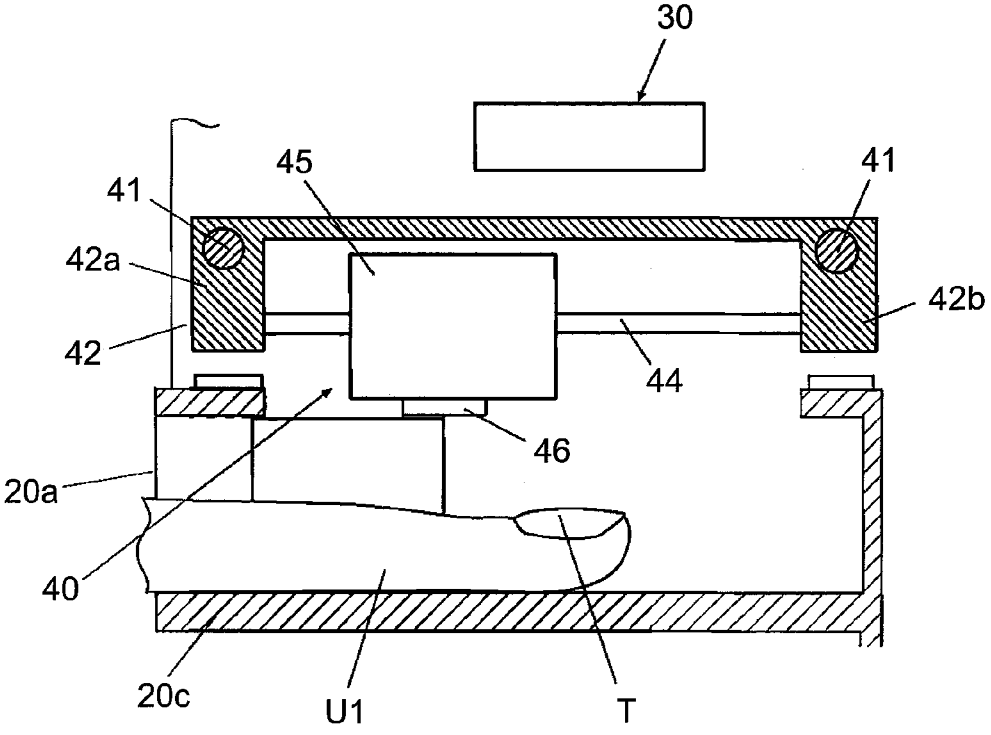
FIG. 6 is a sectional view of a main part schematically showing a relationship among a finger inserted into the printing finger inserting unit, a photographing unit and a printing unit.

FIG. 6 is a main part sectional view schematically showing a positional relationship between the printing finger U1 placed in the printing finger inserting unit 20*a* and the photographing unit 30 and the printing unit 40.

As shown in FIGS. 4 and 5, the photographing unit 30 is provided on the upper machine casing 11*b* in the machine casing 11.

That is, a substrate 31 is set on the upper machine casing 11*b*, and a camera 32 as a photographing device is set at the central portion of the lower surface of the substrate 31.

It is preferable that the camera 32 includes a built-in driver and has approximately two million pixels or more, for example.

The camera 32 photographs the nail T of the printing finger U1 inserted into the printing finger inserting unit 20*a* to obtain a nail image (a finger image including the nail image) which is an image of the nail T of the printing finger U1.

On the substrate 31, lights 33 such as white LEDs are set so as to surround the camera 32. The lights 33 illuminate the nail T of the printing finger U1 at photographing by the camera 32. The photographing unit 30 is configured by including the camera 32 and the lights 33.

In the embodiment, an after-mentioned nail information detecting unit 512 detects at least one of the shape of the nail T, the position of the nail T, and the curvature of the nail T as nail information on the basis of the nail image obtained by the camera 32 as the photographing device.

The photographing unit 30 is connected to a photographing control unit 511 (see FIG. 7) in an after-mentioned control device 50 and controlled by the photographing control unit 511.

Image data of the image obtained by the photographing unit 30 is stored in a nail image storage area 521 of an after-mentioned storage unit 52.

The printing unit 40 is mainly provided in the upper machine casing 11*b*.

That is, as shown in FIGS. 4 and 5, two guide rods 41 are bridged in parallel to each other between the both side boards of the upper machine casing 11*b*.

A main carriage 42 is slidably set at the guide rods 41.

As shown in FIG. 5, two guide rods 44 are bridged in parallel to each other between a front wall 42*a* and a rear wall 42*b* of the main carriage 42.

A secondary carriage 45 is slidably set at the guide rods 44.

A print head 46 is mounted on the central portion of the lower surface of the secondary carriage 45.

In the embodiment, the print head 46 is an ink-jet type print head which makes ink be in the form of micro droplets and directly sprays the ink droplets onto a target to be printed to perform printing.

The recording method of the print head 46 is not limited to the ink-jet type.

In the embodiment, the printing unit 40 is provided with a print head 46 which can print ink of yellow (Y), magenta (M) and cyan (C), for example.

The print head 46 includes a nozzle array formed of a plurality of nozzles spraying ink of the colors.

The print head 46 provided in the printing unit 40 is not limited to the print head 46 spraying ink of the three colors. A print head 46 spraying ink of another color may be further provided.

The print head 46 prints an image (nail design) on the surface of the nail T of the printing finger U1.

The print head 46 performs printing on the nail T of the printing finger U1 on the basis of the nail information detected by the after-mentioned nail information detecting unit 512.

In the embodiment, as mentioned above, in addition to the "normal mode" in which the nail design itself is printed, the "attachment guide mode" in which placement information of decorative parts can also be printed can be selected as the print mode.

Then, when the "attachment guide mode" is selected, the print head 46 prints the placement information of decorative parts to be placed on the nail T on the nail T as after-mentioned.

Ink cartridges 48 for supplying ink to the print head 46 are provided in the lower machine casing 11*a*.

The ink cartridges 48 are connected to the print head 46 via an ink supply tube (not shown in the drawings) to appropriately supply ink to the print head 46. Here, the configuration may be such that the ink cartridges are mounted on the print head 46 itself.

The main carriage 42 is joined to a motor 43 via a power transmission unit and is configured to move to the left and right (left and right in FIG. 4) of the nail print apparatus 1 along the guide rods 41 by the forward-reverse rotation of the motor 43.

The secondary carriage 45 is joined to a motor 47 via a power transmission unit and is configured to move back and forth (left and right in FIG. 5) of the nail print apparatus 1 along the guide rods 44 by the forward-reverse rotation of the motor 47.

The printing unit 40 is configured by including the guide rods 41, the main carriage 42, the motor 43, the guide rods 44, the secondary carriage 45, the print head 46, the motor 47, the ink cartridges 48 and others.

The motor 43, the print head 46 and the motor 47 of the printing unit 40 are connected to the print control unit 515 of the after-mentioned control device 50 and controlled by the print control unit 515.

The control device 50 is set on the substrate 31 disposed on the upper machine casing 11*b* and the like, for example.

FIG. 7 is a main part block diagram showing a control structure in the embodiment.

As shown in FIG. 7, the control device 50 is a computer which includes a control unit 51 having a CPU (Central Processing Unit) and such like and a storage unit 52 having a ROM (Read only memory), a RAM (Random access memory) and such like which are not shown in the drawings.

Various programs for operating the nail print apparatus 1 and various data are stored in the storage unit 52.

Specifically, in the storage unit 52, various programs such as a print data generation program for generating print data suitable for a print mode, a nail information detecting program for detecting nail information of the nail T and a printing program for performing a printing process are stored, for example, and the control device 50 executes the programs to control the units of the nail print apparatus 1.

In the embodiment, the storage unit 52 is provided with a nail image storage area 521 for storing a nail image of the nail T of the printing finger U1 of the user obtained by the photographing unit 30 and a nail design storage area 522 for storing nail design image data ND to be printed on the nail T.

Figure 8:
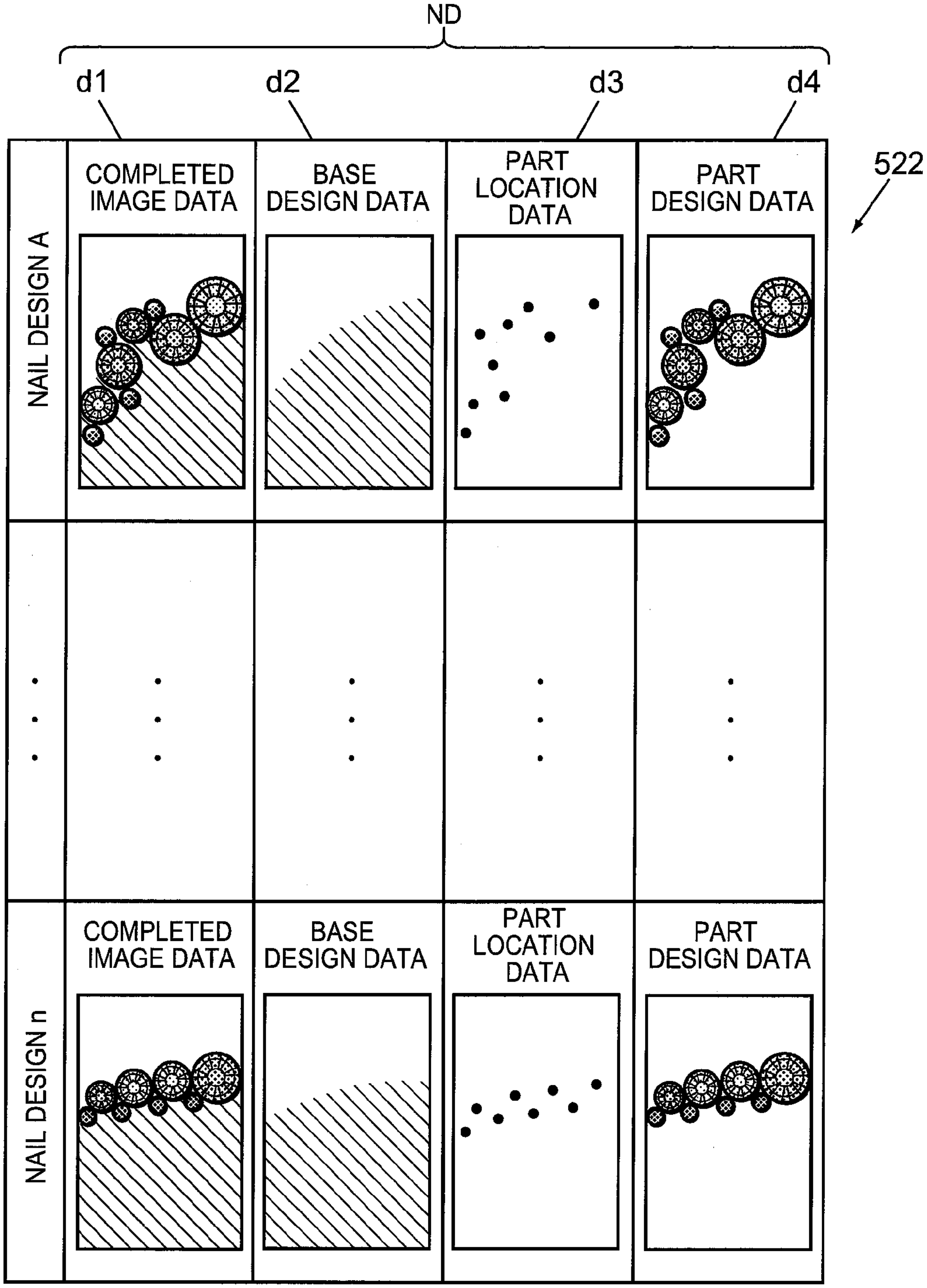
FIG. 8 is a diagram showing a configuration example of a nail design storage area.

FIG. 8 is a diagram showing a configuration example of the nail design storage area 522 in the embodiment.

As shown in FIG. 8, the nail design image data ND is stored for each of the nail designs (nail designs A to n in FIG. 8, for example) in the nail design storage area 522.

Here, each of the nail design image data ND includes completed image data d1, base design data d2, part location data d3 and part design data d4.

The nail design image data ND may be common to all the fingers. However, it is preferable to prepare different nail design image data ND by the type of finger.

Generally, since the nail size varies by the type of finger, for example, well-balanced nail designs can be printed on nails of fingers if nail design image data ND in which many decorative parts are placed is prepared for the nail of the thumb which is relatively large and nail design image data ND in which few decorative parts are placed is prepared for the nail of the little finger which is relatively small.

When the nail design is prepared by the type of finger in such way, a set of nail design image data ND which are related to each other may be prepared in the nail design storage area 522 for the nail of each finger of thumb to little finger so that the nail designs having unity are printed on all the fingernails of the thumb, index finger, middle finger, ring finger and little finger.

The nail design image data ND may be stored as a nail design for a large nail and a nail design for a small nail, for example, in the nail design storage area 522 by the size so that the user can freely select the nail design image data ND suitable for each size of his/her fingernails and combine the nail design image data ND.

FIG. 8 shows specific examples of completed image data d1, base design data d2, part location data d3 and part design data d4 for a nail design A.

As shown in FIG. 8, the completed image data d1 is data showing a completed image when the nail design A is printed on the nail T and including images of decorative parts to be attached onto the nail T in the nail design A.

The completed image data d1 is used when displaying the design confirmation screen on the display unit 13, for example.

In the embodiment, the completed image data d1 includes part size data d1-1 (see FIG. 10C) which is size information of decorative parts forming the nail design A.

The completed image data d1 may include color information, shape information and such like of decorative parts.

The base design data d2 is data of a background design of the nail design A.

The part location data d3 is data showing position information of decorative parts to be attached onto the background design of the nail design A. The part location data d3 is formed of x and y coordinates which specify the position of each of the decorative parts when placing the nail T on an x-y plane, for example.

The data type of the part location data d3 is not especially limited as long as the positions of the decorative parts can be specified.

The part design data d4 is data of images showing the shapes and sizes of the decorative parts to be attached onto the nail T in the nail design A and includes shape information and such like of the decorative parts.

The part design data d4 further includes part color data d4-1 (see FIG. 10C, for example) which is color information showing the colors of the decorative parts forming the nail design A.

The part design data d4 may further include size information and such like showing the sizes of the decorative parts.

In a functional view, the control unit 51 includes functional units such as the photographing control unit 511, the nail information detecting unit 512, the print data generation unit 513, the display control unit 514 and the print control unit 515.

The functions as the photographing control unit 511, the nail information detecting unit 512, the print data generation unit 513, the display control unit 514 and the print control unit 515 are achieved in cooperation between the CPU of the control unit 51 and the programs stored in the ROM and such like of the storage unit 52.

The functional units included in the control unit 51 are not limited to the above examples.

The photographing control unit 511 controls the photographing unit 30 to photograph each of the printing fingers U1 of the user and obtains the nail image of the nail T (finger image including the nail image).

The nail image obtained by the photographing unit 30 is stored in the nail image storage area 521 of the storage unit 52.

The nail information detecting unit 512 detects the nail information for the nail T of the printing finger U1 on the basis of the nail image obtained by the camera 32 which is the photographing device.

Here, the nail information includes the outline of the nail T (the nail shape), the height of the nail T (location in the vertical direction of the nail T) and the curvature of the nail T (nail curvature), and the nail information detecting unit 512 detects at least one of the nail shape, nail height and nail curvature as the nail information.

In the embodiment, the nail information detecting unit 512 detects the outline of the nail T (nail shape) on the basis of the nail image.

Specifically, the nail information detecting unit 512 detects the outline (shape) and location of the nail T from the finger image which is obtained by the camera 32 and includes the nail image of the nail T of the printing finger U1, and obtains the outline as information represented by x and y coordinates and such like.

Though the method of detecting the outline (shape) of the nail T by the nail information detecting unit 512 is not especially limited, for example, the nail information detecting unit 512 detects the outline (shape) of the nail T on the basis of the difference in color and such like between the nail T and the other finger portion from the finger image including the nail image of the nail T of the printing finger U1 obtained by the camera 32.

The method of detecting the outline (shape) of the nail T by the nail information detecting unit 512 is not especially limited and not limited to the above examples.

In a case where the nail information detecting unit 512 also detects the nail height and the nail curvature, printing can also be performed in consideration of the shape of the nail T in the height direction, which can achieve more highly accurate printing.

The print data generation unit 513 generates print data corresponding to the print mode selected by the user operating the operation unit 12 and such like.

In the embodiment, as mentioned above, the "attachment guide mode" in which the placement information of decorative parts can also be printed can be selected as the print mode in addition to the "normal mode" for printing the nail design itself.

Here, the placement information of decorative parts includes at least one of the position information showing the guide of the attachment positions of decorative parts, size information of decorative parts and color information of decorative parts.

In the embodiment, any one of the "part reduction print mode", "location guide and size print mode" and "location guide print mode" can be selected as the "attachment guide mode".

Figure 10A:
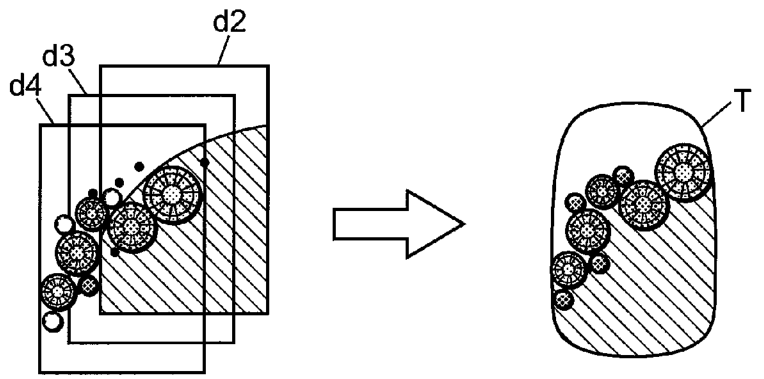
FIG. 10A is an explanation view showing a configuration example of print data and a state where the print data is printed on a nail in a case of printing in a normal mode.

FIG. 10A shows an example of print data generated by the print data generation unit 513 and an example of printing performed on the nail T on the basis of the print data when printing in the "normal mode" is selected for the nail design A shown in FIG. 8.

As shown in FIG. 10A, in the "normal mode", the print data generation unit 513 extracts the base design data d2, the part location data d3 and the part design data d4 in the nail design image data ND. Then, print data is generated on the basis of the extracted data.

In this case, the print head 46 prints images corresponding to the decorative parts (the images showing decorative parts such as images of red or silver rhinestones, for example) in the same colors as the decorative parts at the positions in the nail T at which the decorative parts are to be placed.

That is, the print data generation unit 513 generates the print data so that the image of each of the decorative parts based on the part design data d4 is printed in the color based on part color data d4-1 which is included in the part design data d4.

As for the size and shape of each of the decorative parts, printing is also performed on the basis of part size data d1-1 included in the completed image data d1 and the data included in the part design data d4.

Thus, in the "normal mode", as shown in the right side of the arrow in FIG. 10A, an image which looks nice as a nail art even without attaching decorative parts later similarly to the completed image when actually applying the nail design A to the nail T is printed on the nail T.

Further, in a case of attaching the decorative parts after the printing in the "normal mode", the images are hardly noticeable even if the decorative parts are peeled off, which makes the nail design enjoyable for a long time.

As the nail design image data ND stored in the nail design storage area 522, the design not intended to attach the decorative parts may be included. In such case, printing in the "normal mode" is automatically selected.

Here, the left diagram of FIG. 10A is a diagram conceptually showing the process of generating the print data by superimposing the base design data d2, the part location data d3 and the part design data d4, and the rectangles of the base design data d2, the part location data d3 and the part design data d4 conceptually show the respective data.

Then, the diagram shows, by illustration, the concept of the process of generating the print data by superimposing the data so as to correspond to each other in a one-to-one relationship. The same can be applied to the left diagrams of following FIGS. 10B to 10D.

Figure 10B:
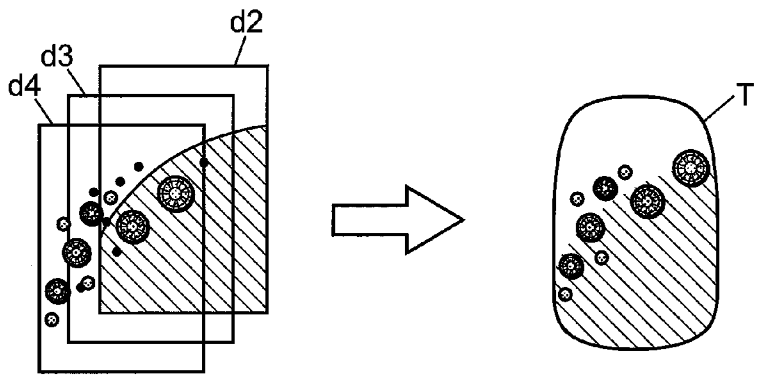
FIG. 10B is an explanation view showing a configuration example of print data and a state where the print data is printed on a nail in a case of printing in a part reduction print mode.

Next, FIG. 10B shows an example of print data generated by the print data generation unit 513 and an example of printing performed on the nail T on the basis of the print data when printing in the "part reduction print mode" is selected for the nail design A shown in FIG. 8.

As shown in FIG. 10B, in the "part reduction print mode", the print data generation unit 513 extracts the base design data d2, part location data d3 and part design data d4 in the nail design image data ND as in the "normal mode".

Then, the print data generation unit 513 reduces the sizes of decorative parts in the part design data d4 to generate print data on the basis of the respective data.

Here, in reducing the part design data d4, reduction is performed only on the sizes of the images showing the individual decorative parts included in the part design data d4, and the central positions of the decorative parts are not moved.

When all the images showing the decorative parts are uniformly reduced, the reduced images of relatively small decorative parts are excessively small and the visibility thereof cannot be secured in some cases. Thus, a predetermined setting value such as a minimum reducible size (mm) may be previously determined and printing may be performed uniformly in the size of the predetermined setting value for the images which will be equal to or smaller than the setting value if reduced at the same reduction rate.

Alternatively, printing may not be performed for the images which will be smaller than the predetermined setting value if reduced at the same reduction rate.

Alternatively, reduction may not be performed and printing may be performed at the predetermined size for the images which will be smaller than the predetermined setting value if reduced at the same reduction rate.

How to treat the images of the decorative parts which will be equal to or smaller than the predetermined setting value if reduced may be previously determined by default. Alternatively, the user may freely set what value (mm) to set as the predetermined setting value and whether to perform printing when the images will be equal to or smaller than the predetermined setting value, for example.

Figure 10C:
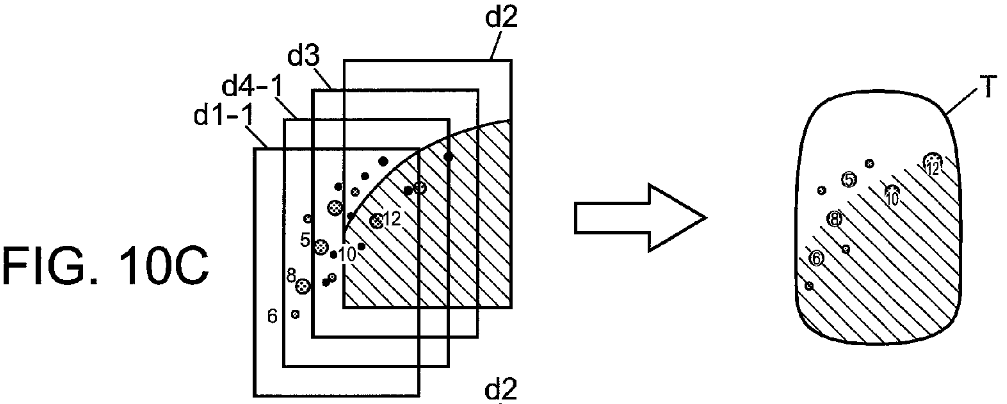
FIG. 10C is an explanation view showing a configuration example of print data and a state where the print data is printed on a nail in a case of printing in a "location guide and size information print mode"

Next, FIG. 10C shows an example of print data generated by the print data generation unit 513 and an example of printing performed on the nail T on the basis of the print data when printing in the "location guide and size print mode" is selected for the nail design A shown in FIG. 8.

As shown in FIG. 10C, in a case of "location guide and size print mode", the print data generation unit 513 extracts the base design data d2, the part location data d3, the part size data d1-1 and the part color data d4-1 in the nail design image data ND.

Then, the print data generation unit 513 generates the print data by superimposing the extracted data.

Here, the spots in the part location data d3 show the positions of the respective decorative parts, and the numbers (size numbers) in the part size data d1-1 show the sizes of the respective decorative parts.

The positions of spots in the part location data d3 and size numbers in the part size data d1-1 in the print data match the central positions of the images showing the individual decorative parts included in the part design data d4.

Then, the sizes of the spots and size numbers are made smaller than the decorative parts so as to be proportional to the sizes of the respective decorative parts. That is, the sizes are large for relatively large decorative parts and small for relatively small decorative parts.

In a case where the decorative parts to be attached are relatively small, when the sizes of the spots and size numbers corresponding to the decorative parts are made proportional to the respective decorative parts, the spots and the size numbers become excessively small and the visibility of the spots and size numbers cannot be secured in some cases. Thus, for example, a predetermined minimum value (mm) of the sizes of the spots and size numbers may be previously determined to perform printing uniformly by the size of the minimum value for the spots and size numbers which will be smaller than the minimum value if the sizes thereof are made proportional to the sizes of the decorative parts.

Alternatively, printing may not be performed for the decorative parts for which spots and size numbers will be smaller than the minimum value.

How to handle the decorative parts for which the spots and size numbers will be smaller than the predetermined minimum value if the sizes thereof are made proportional to the sizes of the decorative parts may be previously determined by default. Alternatively, the user may freely set what value (mm) to set as the predetermined minimum value and whether to perform printing when the spots and the size numbers will be smaller than the predetermined minimum value.

Figure 10D:
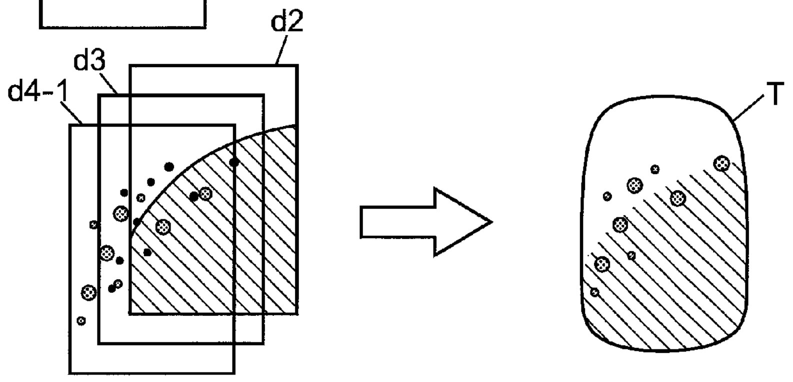
FIG. 10D is an explanation view showing a configuration example of print data and a state where the print data is printed on a nail in a case of printing in a location guide print mode.

Next, FIG. 10D shows an example of print data generated by the print data generation unit 513 and an example of printing performed on the nail T on the basis of the print data when printing in the "location guide print mode" is selected for the nail design A shown in FIG. 8.

As shown in FIG. 10D, in a case of the "location guide print mode", the print data generation unit 513 extracts the base design data d2, the part location data d3 and the part color data d4-1 in the nail design image data ND.

Then, the print data generation unit 513 generates print data by superimposing the extracted data.

In this case, similarly to the case of "part reduction print mode", the spots showing the positions of decorative parts in the part location data d3 match the central positions of images showing the individual decorative parts included in the part design data d4.

The sizes of the spots, which correspond to the sizes of the respective decorative parts, are large for relatively large decorative parts and small for relatively small decorative parts.

In a case where the decorative parts to be attached are relatively small, when the spots corresponding to the decorative parts are reduced according to the sizes of the respective decorative parts, the spots are excessively small and visibility of the spots cannot be secured in some cases. Thus, for example, a predetermined minimum value (mm) of the sizes of the spots may be previously determined to perform printing uniformly by the minimum value for the images for which the spots will be smaller than the minimum value if reduced according to the sizes of the respective decorative parts.

Alternatively, printing may not be performed for the decorative parts for which spots will be smaller than the minimum value.

How to treat the decorative parts for which the spots will be smaller than the minimum value if reduced according to the sizes of the decorative parts may be previously determined by default. Alternatively, the user may freely set what value (mm) to set as the predetermined minimum value and whether to perform printing when the spots will be smaller than the predetermined minimum value, for example.

Furthermore, in the embodiment, the print data generation unit 513 sets colors of portions showing the decorative parts when the "attachment guide mode" (that is, any one of the "part reduction print mode", "location guide and size print mode" and "location guide print mode") is selected.

The print data generation unit 513 sets the colors of portions showing the decorative parts according to the contents determined by default or the contents selected by the user operating the operation unit 12 and the like.

As the colors of portions showing the decorative parts, for example, relatively eye-catching colors which are the same as or as close as possible to the respective decorative parts to be attached can be selected.

Alternatively, contrary to the above, a color close to the base color of the nail design or the ground color of the nail T which is as inconspicuous as possible may be selected.

In the "attachment guide mode", it is assumed that decorative parts are attached, and each user has various needs as for the attachment of decorative parts.

The needs are, for example, (1) easy attachment work of different decorative parts and (2) to make peeling off of decorative parts less conspicuous by forming a design with the printed picture itself when the attached decorative parts are peeled off.

With respect to this, the various needs can be met by enabling selection of the colors of the portions showing the decorative parts so as to be appropriate colors for the various needs of the users.

When selecting the colors of the portions showing the decorative parts, the user may select a specific color(s).

Alternatively, the user may select either "eye-catching color" (colors close to the colors of decorative parts to be attached, for example) or "inconspicuous color" (close to the ground color such as a base color, for example).

When a specific color(s) is selected for the portions showing decorative parts, the print data generation unit 513 sets the selected color(s) as the color(s) of portions showing the decorative parts.

For example, when the "eye-catching color" is selected, the colors in the part color data d4-1 are set as the colors of portions showing the decorative parts.

Thus, in the "part reduction print mode", for example, images showing decorative parts such as images obtained by reducing the images of red and silver rhinestones and the like are printed as the images corresponding to the decorative parts in the same colors as the decorative parts at the positions to place the decorative parts on the nail T by the print head 46.

In the "location guide and size print mode" and the "location guide print mode", for example, the red and silver spots and the size numbers are printed as images corresponding to the decorative parts in the same colors as the decorative parts at the positions to place the decorative parts on the nail T by the print head 46.

On the other hand, if the "inconspicuous color" is selected, the print data generation unit 513 sets the colors of portions showing the decorative parts, according to a rule which has been previously set, to be intermediate colors between the respective colors in the part color data d4-1 and the color in the base design data d2 or to be the color obtained by converting the color in the base design data d2 into a predetermined color tone, for example.

The print data generation unit 513 generates print data of printing to be performed on the nail T of the printing finger U1 by the print head 46 on the basis of nail information detected by the nail information detecting unit 512.

Specifically, the print data generation unit 513 performs a fitting process such as appropriate reduction of nail design image data ND on the basis of the nail shape detected by the nail information detecting unit 512.

Though the specific method of the fitting process is not especially limited, for example, the nail design image data ND is reduced to such size that the nail design does not run off the edge of the nail T by setting a shorter one between vertical and horizontal lengths of the nail T to be printed as a reference, and thus the nail design image data ND is fitted into the nail T to generate the print data.

The display control unit 514 controls the display unit 13 to display various display screens.

In the embodiment, for example, the display control unit 514 displays a finger image obtained by photographing the printing finger U1, a nail image (an image such as the outline of nail T) included in the finger image, a design selection screen for selecting the image (that is, the "nail design" in FIG. 8) to be printed on the nail T, thumbnail images for design confirmation and instruction screens for displaying various instructions on the display unit 13.

The print control unit 515 outputs the print data of the nail design generated by the print data generation unit 513 to the print head 46 of the printing unit 40 and controls the printing unit 40 so as to perform printing on the nail T with the print head 46 according to the print data.

For example, in a case of printing in the "normal mode", print data for printing an image as shown in the left side of FIG. 10A is sent to the print head 46 via the print control unit 515.

Then, as shown in the right side of the arrow in FIG. 10A, the image same as the completed image of the nail design is printed on the surface of nail T by the print head 46.

On the other hand, in a case of printing in the "part reduction print mode" of the "attachment guide mode", the print data for printing the image as shown in the left side of FIG. 10B is sent to the print head 46 via the print control unit 515.

Then, as shown in the right side of the arrow in FIG. 10B, the base color and reduced images showing decorative parts are printed on the surface of the nail T by the print head 46.

In a case of printing in the "location guide and size print mode" in the "attachment guide mode", print data for printing an image as shown in the left side of FIG. 10C is sent to the print head 46 via the print control unit 515.

Then, as shown in the right side of arrow of FIG. 10C, an image obtained by superimposing the spots showing the positions of decorative parts and the size numbers showing the sizes of decorative parts on the base color is printed on the surface of the nail T by the print head 46.

In a case of printing in the "location guide print mode" in the "attachment guide mode", print data for printing an image as shown in the left side of FIG. 10D is sent to the print head 46 via the print control unit 515. Then, as shown in the right side of arrow in FIG. 10D, an image obtained by superimposing the spots showing the positions of decorative parts on the base color is printed on the surface of nail T.

Next, with reference to FIGS. 9 to 11, a print method by the nail print apparatus 1 in the embodiment will be described.

When performing printing by the nail print apparatus 1, the user turns on the power switch to activate the control device 50, first.

When the user inserts the printing fingers U1 into the printing finger inserting unit 20_a_, the photographing control unit 511 controls the photographing unit 30 to photograph the nail T of each of the printing fingers U1 and obtains the nail image.

When the nail image is obtained, the nail information detecting unit 512 detects the nail shape (outline of the nail T) as nail information from the nail image.

The display control unit 514 displays the design selection screen on the display unit 13.

Then, the user operates operation buttons 121 and such like of the operation unit 12 to select the desired nail design among a plurality of nail designs displayed on the design selection screen. Thus, a selection instruction signal is output from the operation unit 12 and a single nail design is determined as shown in FIG. 9 (step S1).

When the nail design to be printed is determined, next, the display control unit 514 displays the print mode selection screen on the display unit 13 (step S2).

Then, the user operates the operation buttons 121 and such like of the operation unit 12 and selects the desired print mode among a plurality of print modes displayed on the print mode selection screen. Thus, a selection instruction signal is output from the operation unit 12 and the print mode is determined.

Specifically, the control unit 51 determines whether the "normal mode" is selected as the print mode (step S3).

If the control unit 51 determines that the "normal mode" is selected (step S3; YES), the print data generation unit 513 extracts the base design data d2, the part location data d3 and the part design data d4 in the nail design image data ND (see FIG. 10A).

Then, the print data generation unit 513 generates print data by fitting the extracted data into the nail shape (outline of nail T) detected by the nail information detecting unit 512.

The print data generated by the print data generation unit 513 is sent to the print head 46 via the print control unit 515.

Then, on the basis of the print data, as in the drawing shown in the right side of FIG. 10A, the completed image is printed on the nail T without change (step S4).

Next, if it is determined that the "normal mode" is not selected as the print mode (step S3; NO), the control unit 51 further determines whether the "part reduction mode" of the "attachment guide mode" is selected as the print mode (step S5).

If the control unit 51 determines that the "part reduction mode" is selected (step S5; YES), the print data generation unit 513 extracts the base design data d2, the part location data d3 and the part design data d4 in the nail design image data ND (see FIG. 10B).

Then, for the images showing individual decorative parts included in the part design data d4, only the sizes thereof are reduced without moving the central positions of the decorative parts.

Next, the print data generation unit 513 sets the colors of decorative parts (step S6).

Then, the print data generation unit 513 generates the print data by fitting the base design data d2, the part location data d3 and the part design data d4 into the nail shape (outline of nail T) detected by the nail information detecting unit 512.

The print data generated by the print data generation unit 513 is sent to the print head 46 via the print control unit 515.

Then, on the basis of the print data, as in the drawing shown in the right side of FIG. 10B, the image obtained by reducing only the sizes of decorative parts in the completed image is printed on the nail T (step S7).

Next, if it is determined that the "part reduction mode" of the "attachment guide mode" is not selected as the print mode (step S5; NO), the control unit 51 further determines whether the "location guide and size print mode" is selected as the print mode (step S8).

If the control unit 51 determines that the "location guide and size print mode" is selected (step S8; YES), the print data generation unit 513 extracts the base design data d2, the part location data d3, the part size data d1-1 and the part color data d4-1 in the nail design image data ND.

Next, the print data generation unit 513 sets the colors of the respective parts (step S9).

Then, the print data generation unit 513 superimposes the base design data d2, the part location data d3, the part size data d1-1 and the part color data d4-1 (see FIG. 100) and fits the superimposed data into the nail shape (outline of nail T) detected by the nail information detecting unit 512 to generate the print data.

The print data generated by the print data generation unit 513 is sent to the print head 46 via the print control unit 515.

Then, on the basis of the print data, as in the drawing shown in the right side of FIG. 100, the spots (spots in colors corresponding to the colors of the decorative parts in the embodiment) as location guides when attaching the decorative parts and the size numbers as size information are printed on the nail T (step S10).

Next, if it is determined that the "location guide and size print mode" of the "attachment guide mode" is not selected as the print mode (step S8; NO), the control unit 51 further determines whether the "location guide print mode" is selected as the print mode (step S11).

If it is determined that the "location guide print mode" is not selected (step S11; NO), the control unit 51 returns to step S3 and repeats the determination.

On the other hand, if the control unit 51 determines that the "location guide print mode" is selected (step S11; YES), the print data generation unit 513 extracts the base design data d2, the part location data d3 and the part color data d4-1 in the nail design image data ND.

Then, the print data generation unit 513 sets the colors of decorative parts (step S12).

Then, the print data generation unit 513 superimposes the base design data d2, the part location data d3 and the part color data d4-1 (see FIG. 10D), fits the superimposed data into the nail shape (outline of nail T) detected by the nail information detecting unit 512 and thereby generates the print data.

The print data generated by the print data generation unit 513 is sent to the print head 46 via the print control unit 515.

Then, on the basis of the print data, as in the drawing shown in the right side of FIG. 10D, only the spots (in the embodiment, the spots in colors corresponding to the colors of respective decorative parts) as location guides when attaching the decorative parts are printed on the nail T (step S13).

When the printing process is completed, the user removes the printing finger U1 from the nail print apparatus 1.

Then, the user attaches the decorative parts on the nail T according to the attachment location guides which are printed. Thus, the nail design is completed.

Figure 11A:
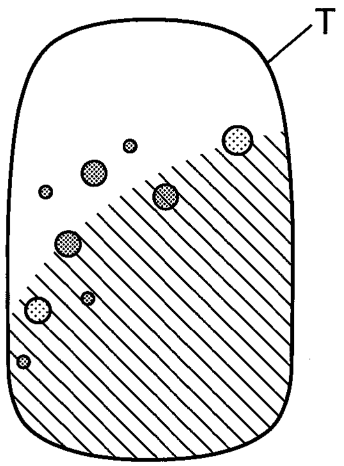
FIG. 11A is a diagram showing a state of a nail after printed in the location guide print mode.

FIG. 11A is a diagram showing an example of printing on the nail T in a case where the nail design A shown in FIG. 8 is selected as the nail design and the "location guide print mode" is selected as the print mode.

In this case, the location guide for attaching the decorative parts are printed on the nail T as the spots in colors corresponding to the colors of the respective decorative parts (for example, red spots at the positions to attach red decorative parts and silver spots at the positions to attach silver decorative parts).

Figure 11B:
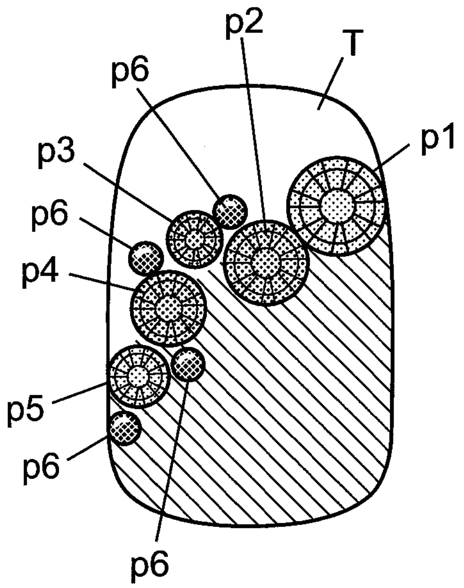
FIG. 11B is a plan view of the nail showing a state where decorative parts are attached to the nail shown in FIG. 11A.

FIG. 11B is a diagram showing a state where the decorative parts are attached onto the nail T according to the printed location guides.

As shown in FIG. 11B, decorative parts in the same color (red, for example) are attached to the portions of the rightmost spot and the second spot from the left in the drawing. Decorative parts in the same color (silver, for example) which is different from the above (red, for example) are attached to the portions of the second, fourth and sixth spots from the right in the drawing. Then, decorative parts in the same color (gold, for example) different from the above two (red and silver, for example) are attached to the other spot portions.

In this print mode, the size information (the numbers indicating sizes) of decorative parts are not printed. Thus, the user cannot precisely determine the sizes of the respective decorative parts from the spots printed on the nail T. Therefore, the user selects the sizes of the decorative parts to attach them while seeing a finished goods sample such as a picture. The user may determine the sizes of decorative parts in his/her own preference and make appropriate arrangement to attach them.

Figure 11C:
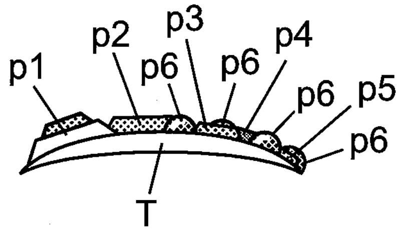
FIG. 11C is a diagram of the nail shown in FIG. 11B seen from the nail tip side.

FIG. 11C is a diagram of the nail T after attaching the decorative parts shown in FIG. 11B, the nail T seen from the tip side of the nail T.

As shown in FIGS. 11B and 11C, red decorative parts p1 and p5 are attached to the portions of the rightmost spot and the second spot from the left in the drawing, for example. Silver decorative parts p2, p3 and p4 are attached to the portions of the second, fourth and sixth spots from the right in the drawing, for example. Then, gold small decorative parts p6 are attached to the other four spot portions, for example.

In this print mode, the size information of decorative parts are printed. Thus, the user can precisely determine the sizes of the respective decorative parts from the size information printed on the nail T. Therefore, the user can select decorative parts in appropriate sizes from the plurality of decorative parts which are prepared and attach them to appropriate positions.

Figure 9:
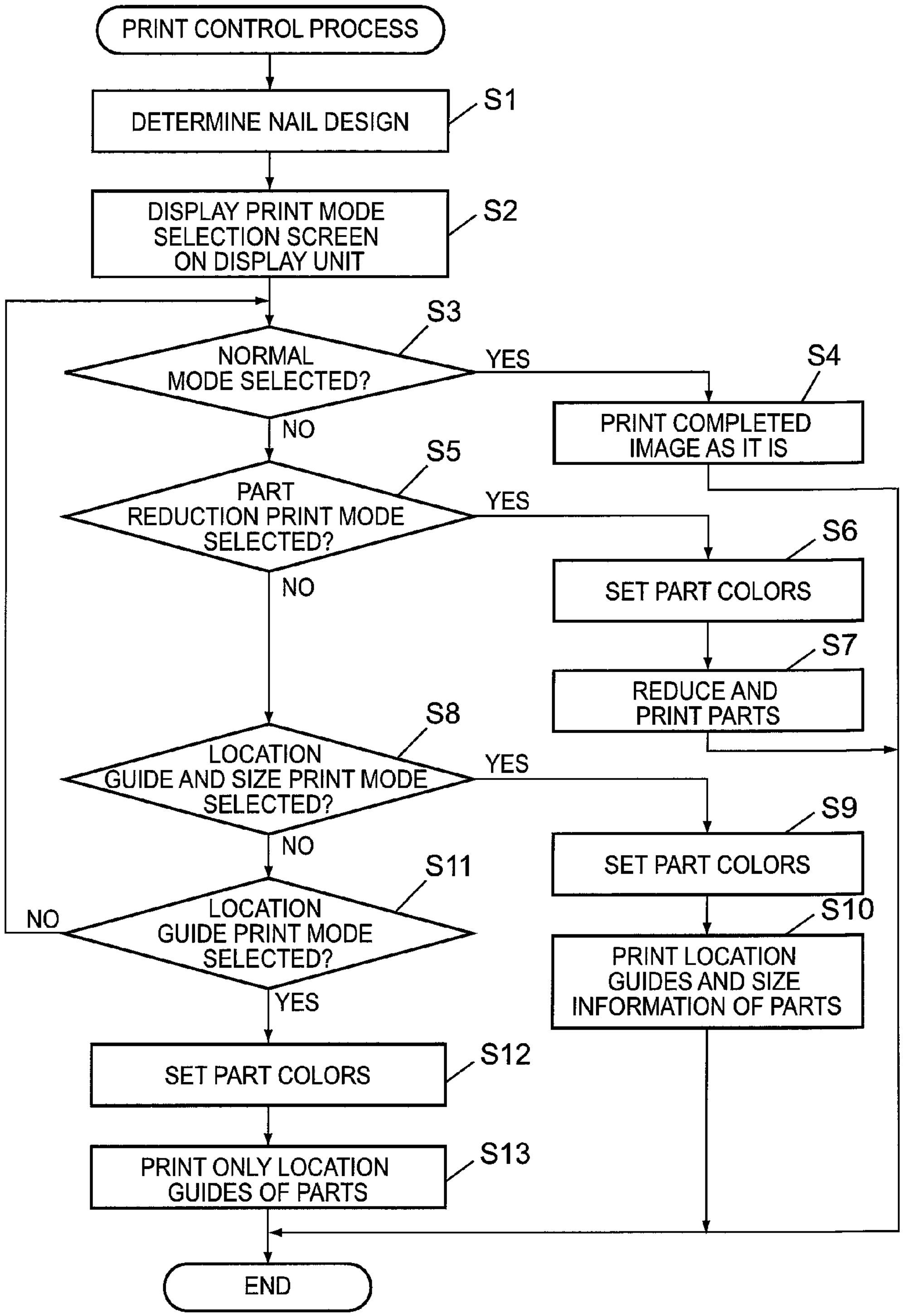
FIG. 9 is a flowchart showing a print control process in the embodiment.

The determination procedure of print mode is not limited to that shown in FIG. 9.

For example, it may be first determined whether any of the three modes of the "attachment guide mode" is selected, and if none of the "attachment guide mode" is selected, it may be determined whether printing in the "normal mode" is selected.

As described above, according to the nail print apparatus 1 of the embodiment, the placement information of decorative parts to be placed on the nail T is printed by the print head 46. Thus, the attachment positions of the decorative parts can be confirmed on the nail T. Therefore, compared with a case in which decorative parts are attached while being compared with a sample and such like, anyone can easily attach the decorative parts at appropriate positions for the design and casually enjoy the nail art decorated with the decorative parts such as rhinestones.

Since the nail information detecting unit 512 detects at least one (nail shape, in the embodiment) of the nail shape, the nail position and the nail curvature as nail information on the basis of a nail image, printing can be performed so as to fit to the nail T of the user, and neat printing without uncoated area and protrusion can be achieved.

In the embodiment, the placement information of decorative parts to be printed on the nail T includes at least one of the size information of decorative parts and the color information of decorative parts in addition to the position information of decorative parts. Thus, where and what type (size and color) of decorative parts to attach can be easily seen by merely looking at the placement information printed on the nail T, and the nail art decorated with decorative parts can be easily enjoyed even without comparison with a sample.

In a case of the “normal mode”, “part reduction print mode” and such like, images corresponding to the decorative parts (for example, images showing decorative parts in the “normal mode” and the “part reduction print mode”, and spots and size numbers respectively showing the positions and sizes of decorative parts in the “location guide and size print mode” and the “location guide print mode”) can be printed in the same colors as the respective decorative parts at the positions to place the decorative parts on the nail T.

Thus, the colors of decorative parts to be attached can be seen merely by looking at the nail T after printing, and appropriate decorative parts can be selected without comparison with a sample and such like, which enables anyone to easily enjoy the nail art decorated with decorative parts.

In a case of printing images showing decorative parts in the same colors as the colors of the decorative parts in the “normal mode”, a nail art can be formed with the printed image itself even without attaching decorative parts, and thus fashionable coordination can be casually enjoyed. Furthermore, in this case, even when the decorative parts are peeled off, the peeled portion can be less noticeable, which makes the nail design enjoyable for a long time.

In the embodiment, in the “part reduction print mode”, the location guide and size print mode” and the “location guide print mode” which are the “attachment guide modes”, the images corresponding to the decorative parts are printed in sizes smaller than those of the decorative parts to be attached. Thus, when attaching the decorative parts, the images printed on the nail T do not protrude from below the decorative parts even when there are some positional gaps, which leads to a beautiful finishing.

Since the images printed on the nail T do not protrude from below the decorative part even if the attachment positions are shifted a little, a little arrangement can be made (the attachment positions of decorative parts can be adjusted) in user’s preference.

In a case where the “location guide and size print mode” is selected, ink can be saved compared with the “normal mode” and the “part reduction print mode”, and in addition, which size of decorative part to attach is clearly seen, which enables authentically recreating a professional design without looking at the original sample material and such like.

In a case where the “location guide print mode” is selected, ink can be saved compared with the “normal mode” and the “part reduction print mode”, and in addition, images printed on the nail T are easy to see when attaching the decorative parts since less information is printed on the nail T, which facilitates the attachment work.

Though the embodiment of the present invention has been described above, the present invention is not limited to the embodiment, and it goes without saying that various changes can be made within the scope of the invention.

For example, though the embodiment has been described by taking, as an example, a case where the part location data d3 showing position information of decorative parts is formed by the two-dimensional coordinates of x and y which specify the positions of the decorative parts on an x-y plane when the nail T is placed on the x-y plane, the configuration of the part location data d3 is not limited to this.

For example, the part location data d3 may include information regarding decorative parts to be superimposed in the height direction.

Figure 12A:
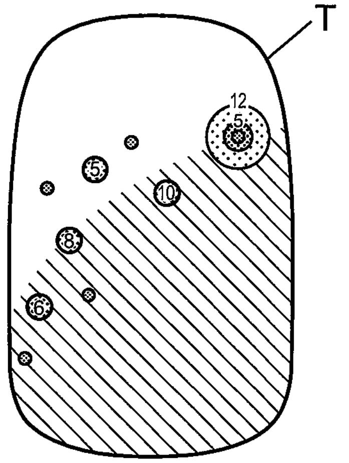
FIG. 12A is a diagram which shows a modification example of the embodiment, showing a state of a nail after printed in the location guide and size information print mode.

In such case, as shown in FIG. 12A, three-dimensional attachment positions of decorative parts are printed on the nail T according to the part location data d3, for example.

Figure 12B:
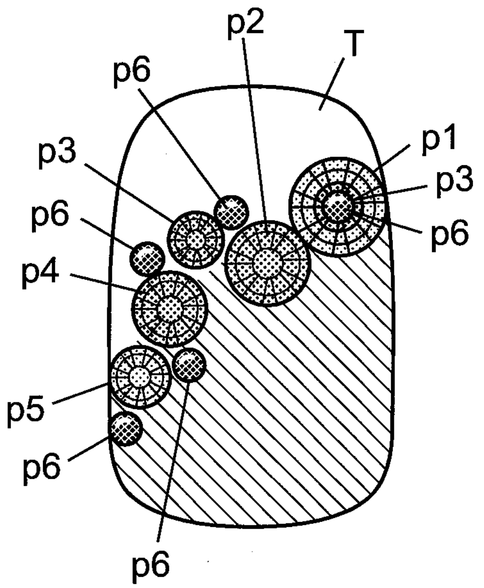
FIG. 12B is a diagram which shows the modification example of the embodiment and is a plan view of the nail showing a state where decorative parts are attached to the nail shown in FIG. 12A.
Figure 12C:
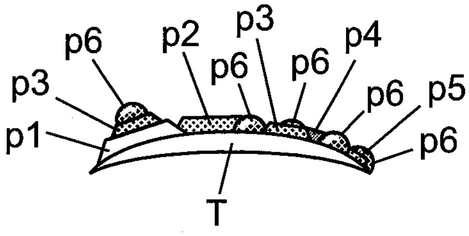
FIG. 12C is a diagram which shows the modification example of the embodiment, and is a diagram of the nail shown in FIG. 12B seen from the nail tip side.

Thus, as shown in FIG. 12B, a part p1 which is a red decorative part in size 12 is attached to the right end of the nail T according to the printed attachment guides of decorative parts. Then, a part p3 which is a silver decorative part in size 5 is attached thereon. A part p6 which is a small gold decorative part is further attached thereon. Thus, by attaching corresponding decorative parts to predetermined positions, a three-dimensional nail design in which a plurality of decorative parts are superimposed in the height direction as shown in FIG. 12C can be achieved.

In the embodiment, there is shown an example in which the portions corresponding to decorative parts are printed in the colors set on the basis of the part color data d4-1 in a case where the “attachment guide mode” (that is, any one of “part reduction print mode”, “location guide and size print mode” and “location guide print mode”) is selected. However, in a case of the “attachment guide mode”, it is not essential to provide the decorative part corresponding portions with the colors corresponding to the respective decorative parts. For example, spots, size numbers, images and such like which are attachment guides of decorative parts may be printed at the decorative part corresponding portions in any color (a single color or a plurality of colors) which can be distinguished from the base color.

The embodiment has been described by taking, as an example, a case where three types of print modes of the “part reduction print mode”, the “location guide and size print mode” and the “location guide print mode” can be selected as the “attachment guide mode” in addition to the “normal mode”. However, selectable print modes are not limited to the examples described here. None of the print modes may be selected and there may be a print mode other than the above print modes which can be selected.

In the embodiment, in a case of the “location guide and size print mode”, printing is performed by superimposing the spots showing colors and positions of the decorative parts and the size numbers showing sizes of the decorative parts. However, the contents to be printed in the “location guide and size print mode” are not limited to them.

For example, by changing the sizes of spots indicating position information of decorative parts according to the size information of the respective decorative parts, the positions and sizes of the decorative parts may be represented only by the spots. In such case, by changing the colors of spots according to the color information of the respective decorative parts, the colors of decorative parts can also be represented by the spots.

By placing the size numbers showing sizes of the decorative parts at positions corresponding to the position information of the decorative parts, the positions and sizes of decorative parts may be represented only by the size numbers. In such case, by changing the colors in which size numbers are shown according to the color information of decorative parts, the colors of decorative parts can also be represented by the size numbers.

In such way, in a case of representing the positions and sizes of decorative parts by only the spots or only the numbers, there is an effect that the spots and the numbers are easy to see when attaching the decorative parts since they do not overlap each other on the nail T.

In such case, there is also an effect that less ink is used since the amount of information to be printed is small.

Furthermore, in a case of the "location guide and size print mode", the sizes of size numbers showing size information may be changed according to the size information.

In such way, the sizes of decorative parts can be grasped more visibly. In this case, as mentioned above, the positions and sizes of the decorative parts may be represented only by the size numbers without printing spots showing the positions of the decorative parts.

Also, the embodiment has been described by taking, as an example, a case where the nail design image data ND stored in the nail design storage area 522 includes the completed image data d1, the base design data d2, the part location data d3 and the part design data d4. However, the configuration of the nail design image data ND is not limited to the above example.

For example, the nail design image data ND may not include completed image data d1, and may be formed only of the base design data d2, the part location data d3 and the part design data d4.

In such case, when a design selection screen is displayed and thumbnail images for confirmation are displayed on the display unit 13, the base design data d2, the part location data d3 and the part design data d4 are superimposed to generate and display the data for display.

Though the embodiment has been described by taking, as an example, a case where the completed image data d1 includes part size data d1-1 which is size information of the decorative parts, the part size data d1-1 may be included in the part design data d4 and such like.

Though the embodiment has been described by taking, as an example, a case where the part color data d4-1 which is color information of the decorative parts is included in the part design data d4, the part color data d4-1 may be included in the completed image data d1 and such like.

Though the embodiment has been described by taking, as an example, a case where the part location data d3 and the part design data d4 are provided separately, the position information of decorative parts, the size information of decorative parts, the color information of decorative parts and such like may form single data as data regarding the decorative parts.

The embodiment has been described by taking, as an example, a case where the completed image data d1, base design data d2, part location data d3 and part design data d4 are stored in the nail design storage area 522 so as to be associated with each other as nail design image data ND for each of the nail designs. However, the nail design image data ND is not limited to this.

For example, a plurality of base design data d2, part location data d3 and part design data d4 may be separately stored in the nail design storage area 522 so that the user can freely select and combine the data.

Alternatively, a combination pattern by default may be stored so that printing is performed in the default combination when the user does not select the combination.

The embodiment has been described by taking an example where the nail image storage area 521 and the nail design storage area 522 are provided in the storage unit 52 of the control device 50. However, the present invention is not limited to the case where the nail image storage area 521 and the nail design storage area 522 are provided in the storage unit 52 of the control device 50, and another storage unit may be provided.

The embodiment has been described by taking, as an example, a nail print apparatus 1 which can perform printing on nails of four fingers sequentially. However, the present invention can be applied to an apparatus in which a finger is inserted one by one and printing is sequentially performed on a nail of a single finger.

The embodiment has been described by taking, as an example, a nail print apparatus 1 which can perform printing on a nail of a finger of hand. However, the present invention can be applied to an apparatus which can perform printing on a nail of toe.

It goes without saying that the present invention is not limited to the embodiment and changes can be appropriately made.

Though several embodiments of the present invention have been described above, the scope of the present invention is not limited to the above embodiments, and includes the scope of inventions, which is described in the scope of claims, and the scope equivalent thereof.

What is claimed is:

1. A nail print apparatus, comprising:

a printing unit which has a print head that performs printing on a nail of a finger or toe; and a control unit which generates (i) a first image by reducing a decorative part image corresponding to at least one decorative part so as to be smaller than the decorative part or (ii) a second image by reducing a size image indicating size information of the decorative part so as to be smaller than the decorative part, and controls the printing unit to print the first image or the second image at a specified attachment position of the decorative part on the nail.

2. The nail print apparatus according to claim 1, wherein the control unit controls the printing unit so as to print the first image in a color which is set.

3. The nail print apparatus according to claim 2, wherein the color is set based on data of color information indicating colors of a background design and the decorative part.

4. The nail print apparatus according to claim 1, wherein in a case in which a size of each of a plurality of reduced decorative part images respectively corresponding to a plurality of decorative parts becomes equal to or larger than a first setting value when the plurality of decorative part images are reduced at a preset reduction rate, the control unit performs control to reduce the plurality of decorative part images at the preset reduction rate and generate a plurality of first images respectively corresponding to the plurality of decorative part images.

5. The nail print apparatus according to claim 1, wherein:

a plurality of decorative part images include a first decorative part group and a second decorative part group, the first decorative part group only including at least one first decorative part image which has a size smaller than a first setting value when the first decorative part image is reduced at a preset reduction rate, and the second decorative part group only including at least one second decorative part image which has a size equal to or larger than the first setting value when the second decorative part image is reduced at the preset reduction rate, the control unit performs control to set a size of a first image for the first decorative part image of the first decorative part group to be the first setting value, to set the first image to be same as the first decorative part image, or to not print the first image for the first decorative part image, and the control unit performs control to set a first image for the second decorative part image of the second decorative part group to be an image obtained by reducing the second decorative part image at the preset reduction rate.

6. The nail print apparatus according to claim 1, wherein the control unit controls the printing unit so as to print the second image in a color which is set.

7. The nail print apparatus according to claim 6, wherein the color is set based on data of color information indicating colors of a background design and the decorative part.

8. The nail print apparatus according to claim 1, wherein when a size of each of a plurality of decorative parts is equal to or larger than a second setting value, the control unit performs control to set sizes of a plurality of second images respectively corresponding to the plurality of decorative parts to be smaller than respective sizes of the plurality of decorative parts and proportional to the respective sizes of the plurality of decorative parts, the second setting value being a size of a decorative part when a size of a smallest second image corresponding to said decorative part from among the plurality of second images is a predetermined minimum value.

9. The nail print apparatus according to claim 1, wherein:

a plurality of decorative parts include a first decorative part group and a second decorative part group, the first decorative part group only including at least one first decorative part having a size smaller than a second setting value, and the second decorative part group only including at least one second decorative part having a size equal to or larger than the second setting value, the control unit performs control to set a size of a second image for the first decorative part of the first decorative part group to be a predetermined minimum value, or to not print the second image for the first decorative part, and the control unit performs control to set a size of a second image for the second decorative part of the second decorative part group to be smaller than a size of the second decorative part and proportional to the size of the second decorative part.

10. A print method of a nail print apparatus, the nail print apparatus including a printing unit having a print head that performs printing on a nail of a finger or toe, the method comprising:

generating (i) a first image by reducing a decorative part image corresponding to at least one decorative part so as to be smaller than the decorative part or (ii) a second image by reducing a size image indicating size information of the decorative part so as to be smaller than the decorative part; and controlling the printing unit to print the first image or the second image at a specified attachment position of the decorative part on the nail.

11. The print method according to claim 10, wherein the controlling includes controlling the printing unit to print the first image in a color which is set.

12. The print method according to claim 10, wherein in a case in which a size of each of a plurality of reduced decorative part images respectively corresponding to a plurality of decorative parts becomes equal to or larger than a first setting value when the plurality of decorative part images are reduced at a preset reduction rate, the method comprises performing control to reduce a plurality of decorative part images at the preset reduction rate and generating a plurality of first images respectively corresponding to the plurality of decorative part images.

13. The print method according to claim 10, wherein:

a plurality of decorative part images include a first decorative part group and a second decorative part group, the first decorative part group only including at least one first decorative part image which has a size smaller than a first setting value when the first decorative part image is reduced at a preset reduction rate, and the second decorative part group only including at least one second decorative part image which has a size equal to or larger than the first setting value when the second decorative part image is reduced at the preset reduction rate, and the method includes:

performing control to set a size of a first image for the first decorative part image of the first decorative part group to be the first setting value, to set the first image to be same as the first decorative part image, or to not print the first image for the first decorative part image, and performing control to set a first image for the second decorative part image of the second decorative part group to be an image obtained by reducing the second decorative part image at the preset reduction rate.

14. The print method according to claim 10, wherein the controlling includes controlling the printing unit to print the second image in an image color which is set.

15. The print method according to claim 10, wherein the method comprises setting sizes of a plurality of second images respectively corresponding to a plurality of decorative parts to be smaller than respective sizes of the plurality of decorative parts and proportional to the respective sizes of the plurality of decorative parts when sizes of each of the plurality of decorative parts is equal to or larger than a second setting value, the second setting value being a size of a decorative part when a size of a smallest second image corresponding to said decorative part from among the plurality of second images is a predetermined minimum value.

16. The print method according to claim 10, wherein:

a plurality of decorative parts include a first decorative part group and a second decorative part group, the first decorative part group only including at least one first decorative part having a size smaller than a second setting value, and the second decorative part group only including a second decorative part having a size equal to or larger than the second setting value, and the method comprises:

performing control to set a size of a second image for the first decorative part of the first decorative part group to be a predetermined minimum value, or not to print the second image for the first decorative part, and performing control to set a size of a second image for the second decorative part of the second decorative part group to be smaller than a size of the second decorative part and proportional to the size of the second decorative part.

17. A nail print apparatus, comprising:

a printing unit which has a print head that performs printing on a nail of a finger or toe; and a control unit which generates first images for a plurality of decorative part images respectively corresponding to a plurality of decorative parts, and controls the printing unit to print the first images at specified attachment positions of the decorative parts on the nail, wherein:

the plurality of decorative part images include a first decorative part group and a second decorative part group, the first decorative part group only including at least one first decorative part image which has a size smaller than a first setting value when the first decorative part image is reduced at a preset reduction rate, and the second decorative part group only including at least one second decorative part image which has a size equal to or larger than the first setting value when the second decorative part image is reduced at the preset reduction rate, the control unit performs control to set a size of a first image for the first decorative part image of the first decorative part group to be the first setting value, to set the first image to be same as a the first decorative part image, or to not print the first image for the first decorative part image, and the control unit performs control to set a first image for the second decorative part image of the second decorative part group to be an image obtained by reducing the second decorative part image at the preset reduction rate.

* * * * *